(12) United States Patent  (10) Patent No.: US 8,556,351 B1
Uhlin  (45) Date of Patent: Oct. 15, 2013

(54) EXPANDABLE WHEEL SHIELD

(76) Inventor: Philip R. Uhlin, Chagrin Falls, OH (US)

( * ) Notice: Subject to any disclaimer, the term of this patent is extended or adjusted under 35 U.S.C. 154(b) by 483 days.

(21) Appl. No.: 12/939,461

(22) Filed: Nov. 4, 2010

(51) Int. Cl.
  *B60B 7/04* (2006.01)
  *B60B 7/08* (2006.01)

(52) U.S. Cl.
  USPC .................................. 301/37.104; 301/37.106

(58) Field of Classification Search
  CPC .................................................. B05B 15/0487
  USPC ............. 301/37.101, 37.103, 37.104, 37.106;
                   D12/213; 118/504, 505; 40/587
  See application file for complete search history.

(56) References Cited

U.S. PATENT DOCUMENTS

| | | | |
|---|---|---|---|
| 2,627,839 A * | 2/1953 | Hudgins et al. ............... | 118/505 |
| 4,792,191 A | 12/1988 | Farmer | |
| 4,874,206 A | 10/1989 | Sampson | |
| 4,955,670 A | 9/1990 | Koller | |
| 5,423,599 A | 6/1995 | Sherod et al. | |
| 5,435,630 A | 7/1995 | Tucker | |
| 5,524,972 A | 6/1996 | Cailor et al. | |
| D418,102 S | 12/1999 | Schehr | |
| 6,485,106 B1 * | 11/2002 | Hermansen et al. ..... | 301/37.103 |
| D477,802 S * | 7/2003 | Williams ..................... | D12/213 |
| 6,846,046 B2 | 1/2005 | Brown | |
| 6,905,177 B1 * | 6/2005 | Murillo .................... | 301/37.103 |
| 7,448,694 B1 * | 11/2008 | Bentley .................... | 301/37.103 |
| 7,784,877 B1 * | 8/2010 | Castillo et al. ........... | 301/37.104 |
| 7,997,662 B1 * | 8/2011 | Babineaux, Sr. ......... | 301/37.103 |

* cited by examiner

Primary Examiner — Kip T Kotter

(57) ABSTRACT

An expandable wheel shield is provided for covering a wheel hub to prevent a product from contacting the wheel hub while applying the product to a tire. The shield includes a central member and a handle coupled to the central member. A plurality of overlapping panels is hingedly coupled to the central member. The panels are radially arranged around the central member. The panels are also coupled to the central member such that the panels are urged into a contracted position when not acted upon by an outside force such as being pressed against a wheel.

13 Claims, 6 Drawing Sheets

EXPANDABLE WHEEL SHIELD

BACKGROUND OF THE DISCLOSURE

Field of the Disclosure

The disclosure relates to wheel shielding devices and more particularly pertains to a new wheel shielding device for covering a wheel hub to prevent a product from contacting the wheel hub while applying the product to a tire.

SUMMARY OF THE DISCLOSURE

An embodiment of the disclosure meets the needs presented above by generally comprising a central member and a handle coupled to the central member. A plurality of overlapping panels is hingedly coupled to the central member. The panels are radially arranged around the central member. The panels are also coupled to the central member such that the panels are urged into a contracted position when not acted upon by an outside force.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
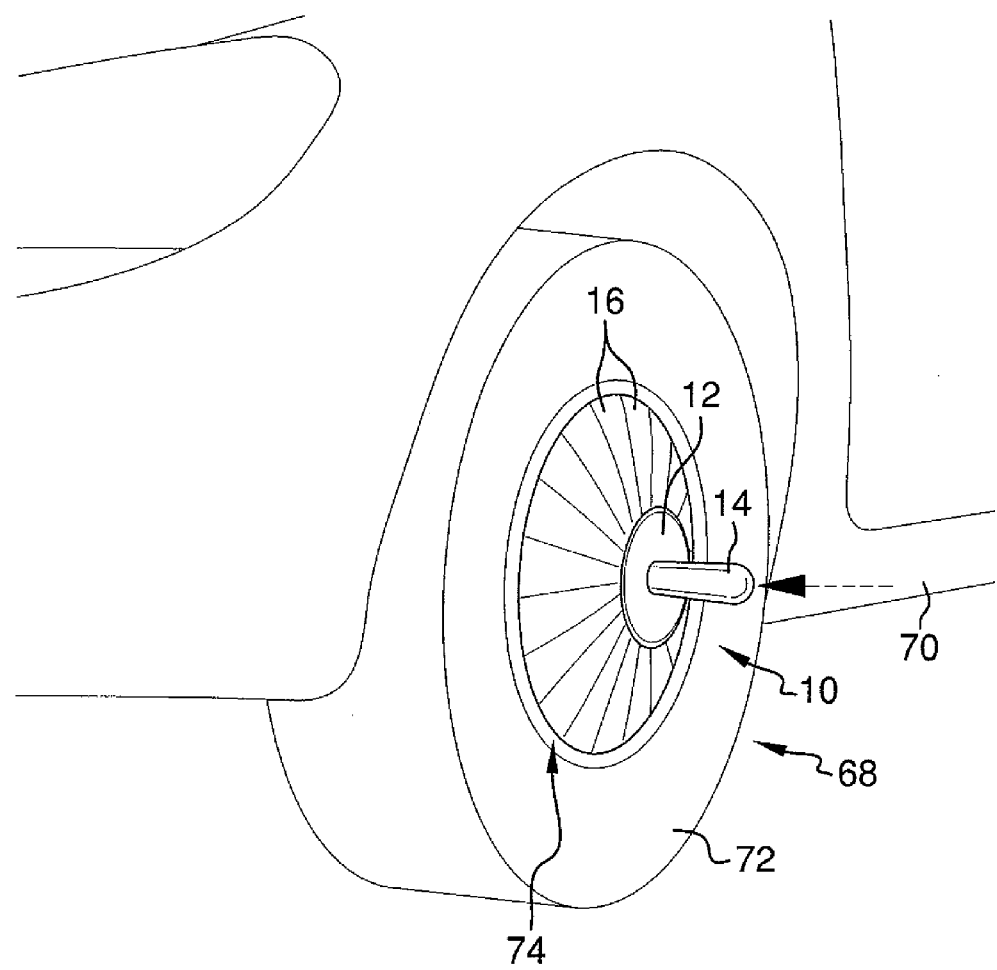
FIG. 1 is an in-use top front side perspective view of a expandable wheel shield according to an embodiment of the disclosure.
Figure 2:
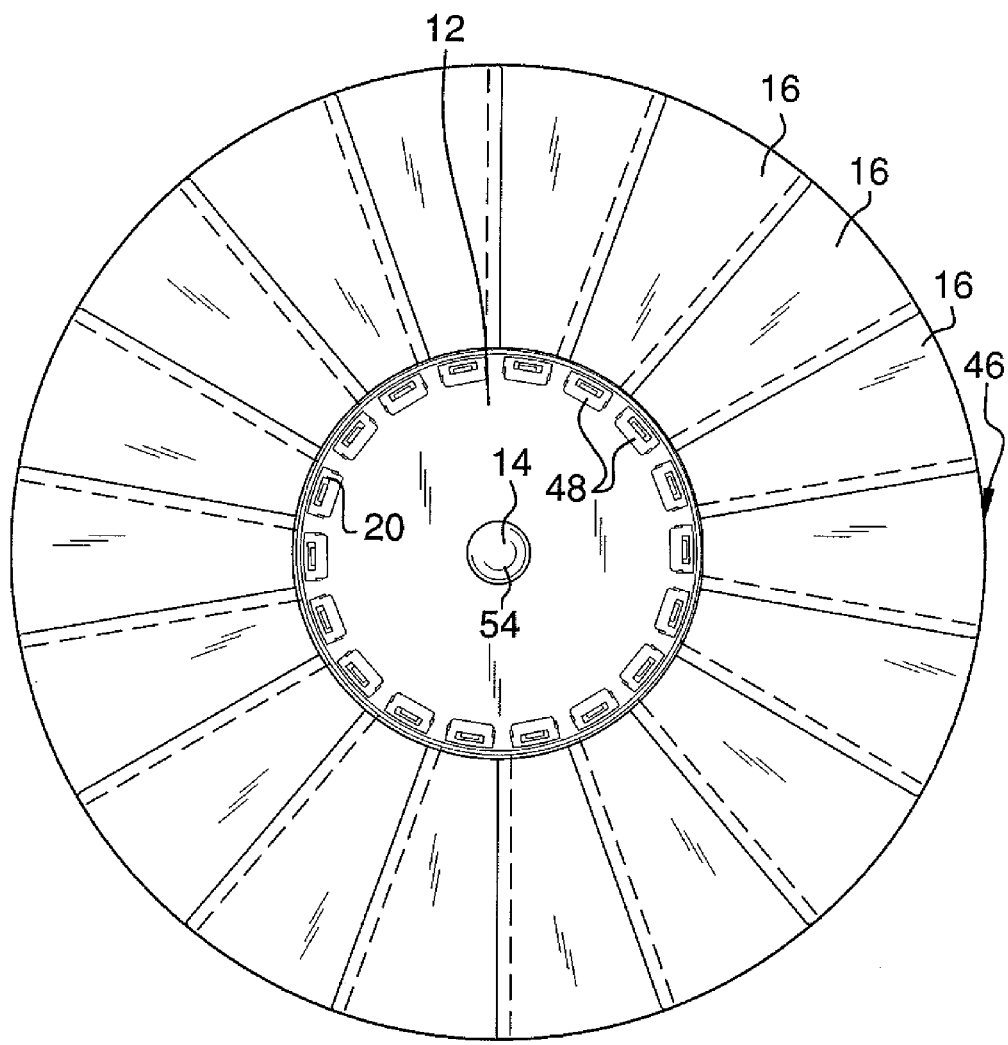
FIG. 2 is a front view of an embodiment of the disclosure.
Figure 3:
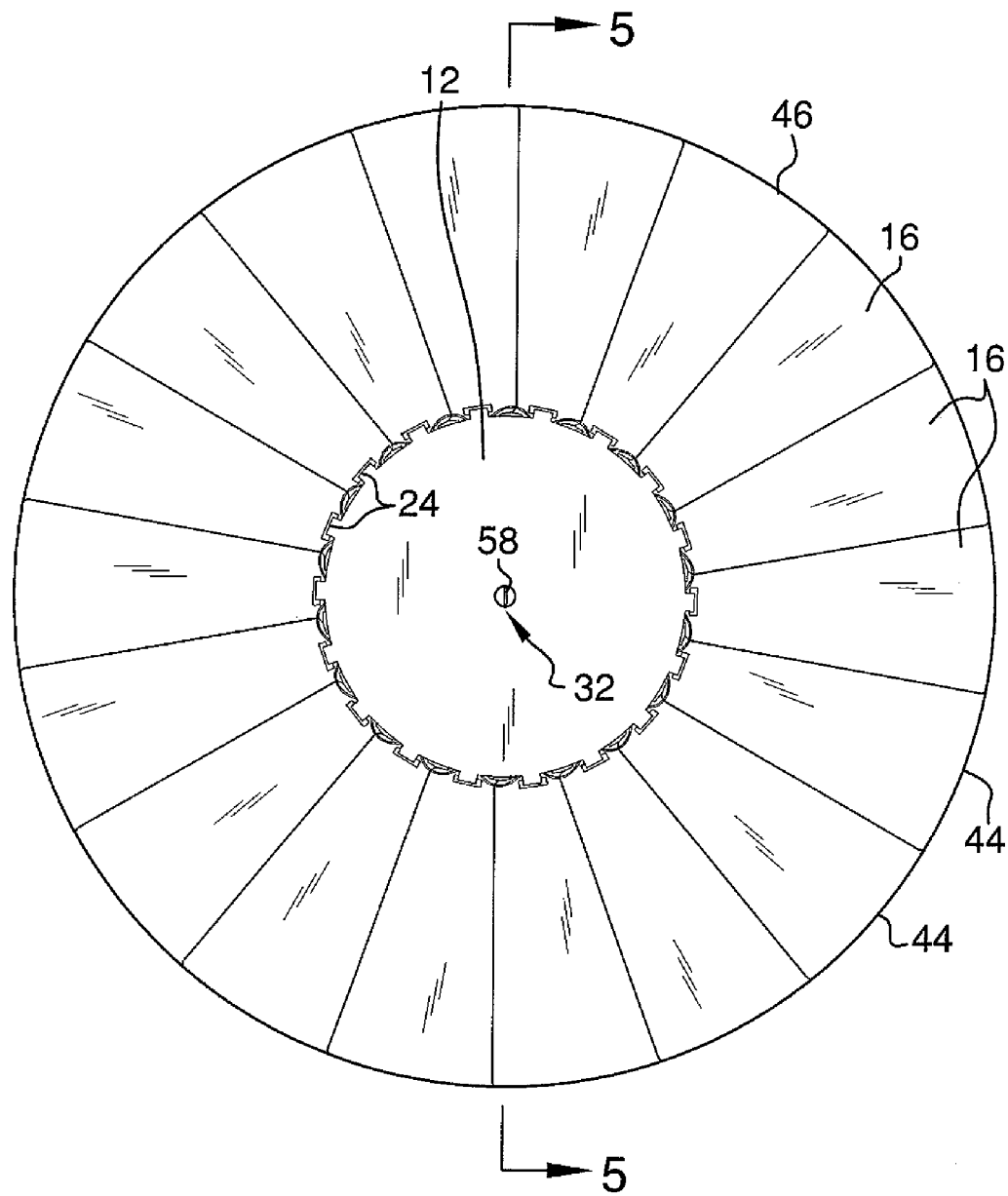
FIG. 3 is a rear view of an embodiment of the disclosure.
Figure 4:
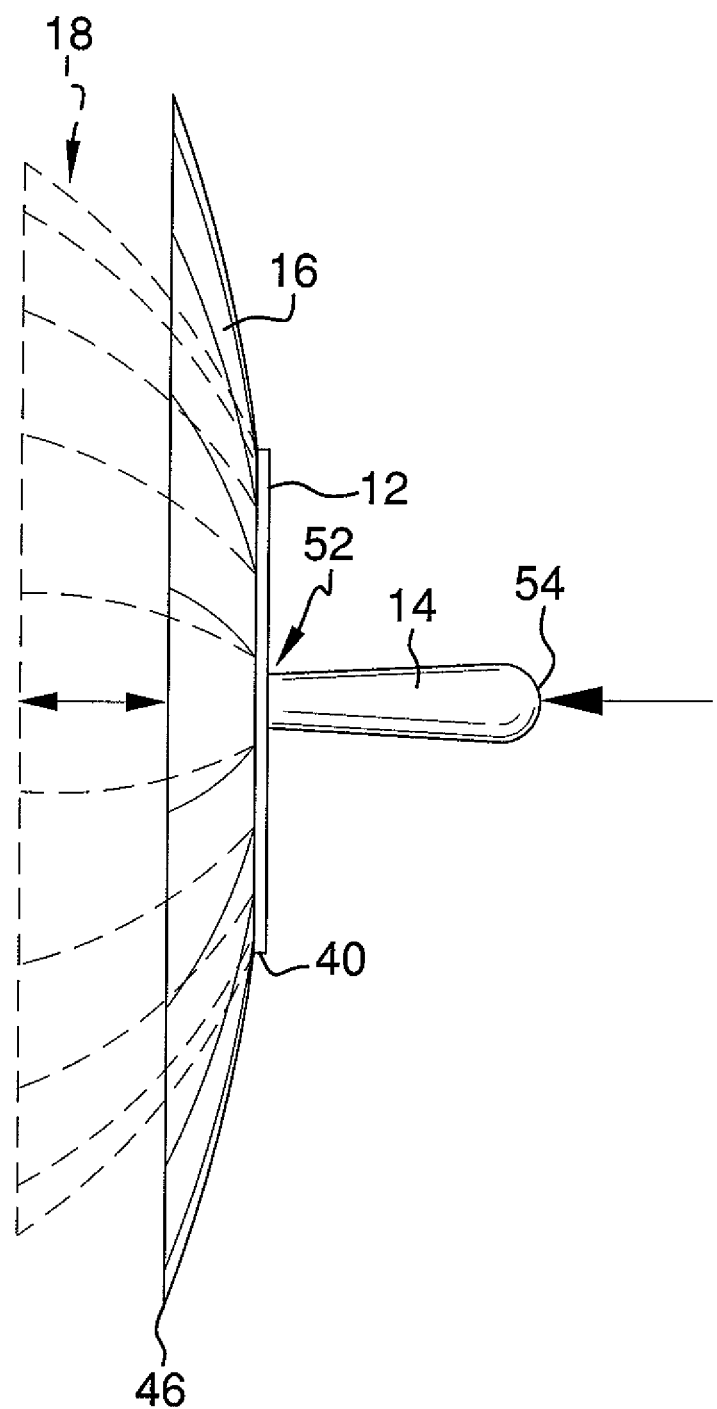
FIG. 4 is a side view of an embodiment of the disclosure.
Figure 5:
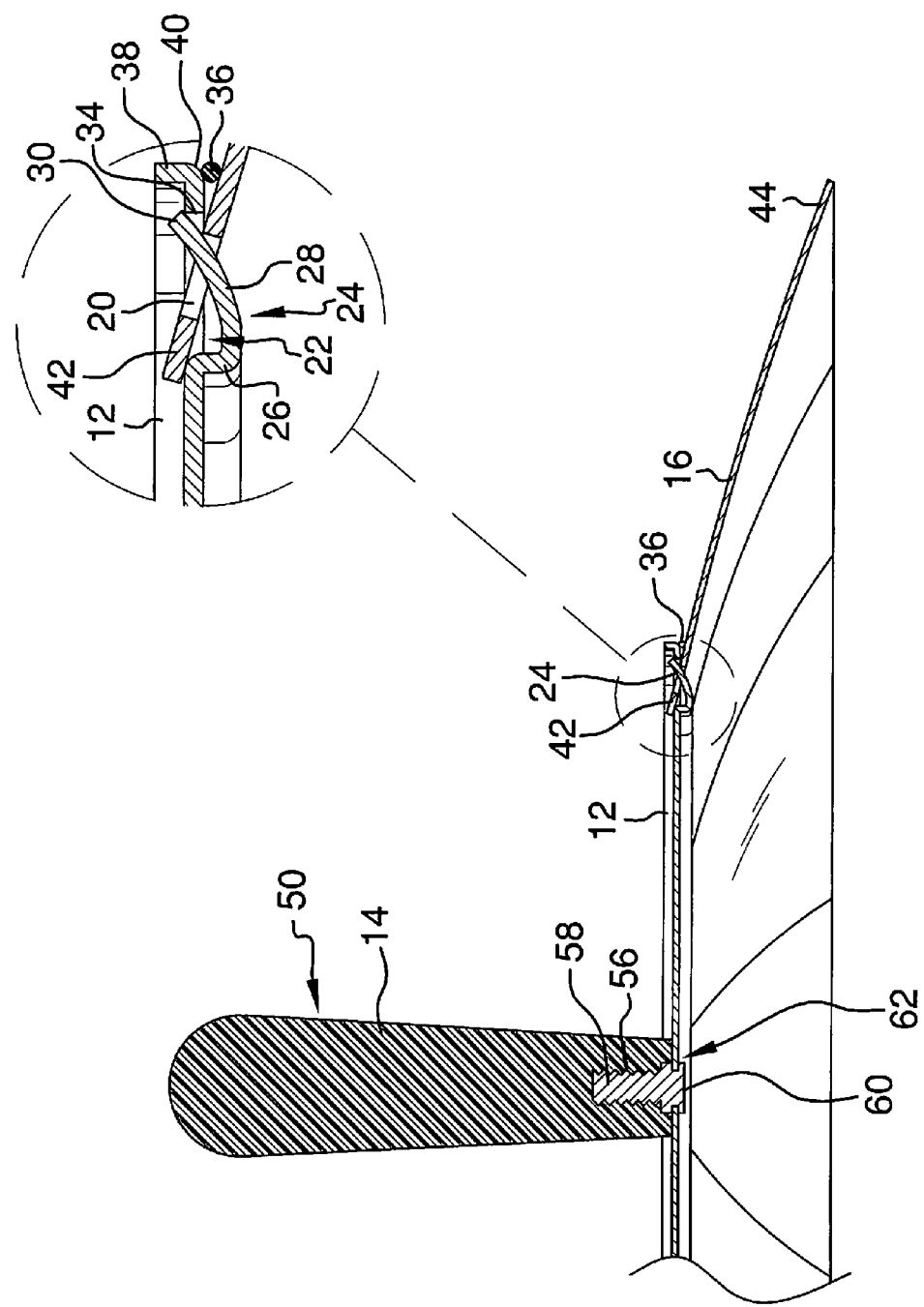
FIG. 5 is a cross-sectional view of an embodiment of the disclosure taken along line 5-5 of FIG. 3.
Figure 6:
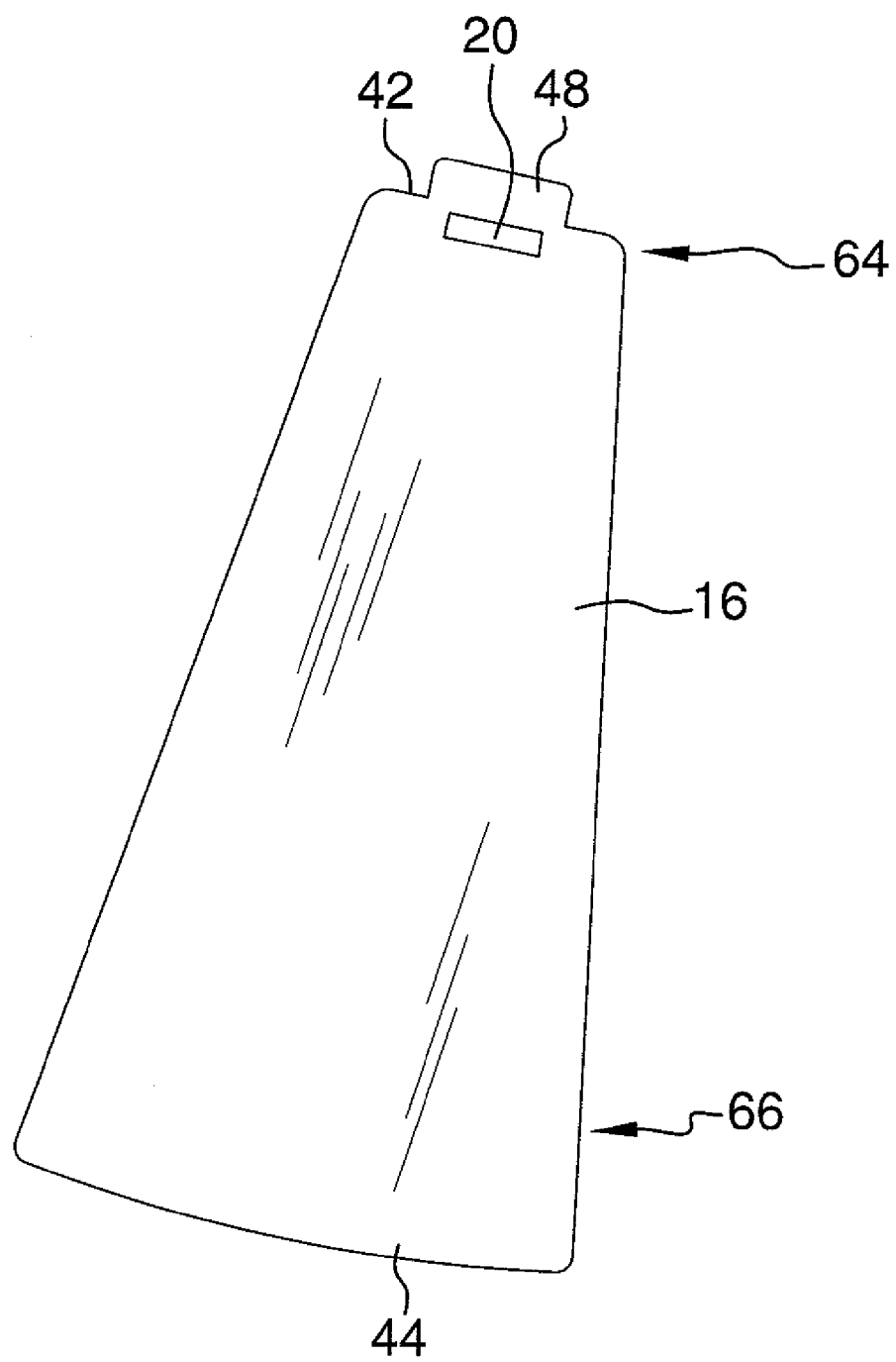
FIG. 6 is a detail view of an embodiment of the disclosure taken along line 6 of FIG. 5.

With reference now to the drawings, and in particular to FIGS. 1 through 6 thereof, a new wheel shielding device embodying the principles and concepts of an embodiment of the disclosure and generally designated by the reference numeral 10 will be described.

As best illustrated in FIGS. 1 through 6, the expandable wheel shield 10 generally comprises a central member 12 and a handle 14 coupled to the central member 12. A plurality of overlapping panels 16 are hingedly coupled to the central member 12. The panels 16 are radially arranged around the central member 12. The panels 16 are also coupled to the central member 12 such that the panels 16 are urged into a contracted position 18 when not acted upon by an outside force.

Each panel 16 has an aperture 20. The central member 12 has a plurality of radially arranged slots 22. Each slot 22 has a hook member 24 extending through the slot 22. Each hook member 24 has an offset portion 26, a medial portion 28 extending from the offset portion 26, and a free distal end 30 relative to a center 32 of the central member 12. The distal end 30 of the hook member 24 abuts a distal edge 34 of the slot 22 relative to the center 32 of the central member 12. Each hook member 24 engages the aperture 20 of an associated panel 16 such that the panel 16 is hingedly coupled to the central member 12. A resilient band 36 extends around the panels 16 urging the panels 16 into the contracted position 18. A circumferential perimeter lip 38 extends around the central member 12 adjacent to the resilient band 36. The lip 38 inhibits the band 36 from disengaging the panels 16 by passing over a perimeter edge 40 of the central member 12.

Each panel 16 is arcuate extending between a proximal end 42 relative to the center 32 of the central member 12 and a distal end 44 of the panel 16 relative to the central member 16. Each of the distal ends 44 of the panels 16 align to form a circular outer perimeter edge 46. Each panel 16 is also arched extending along a length of the panel 16. Each panel 16 has a protrusion 48 extending from the proximal end 42 of the panel 16. The aperture 20 of each panel 16 is positioned in the protrusion 48 of the panel 16.

The handle 14 is positioned in alignment with the center 32 of the central member 12. The handle 14 is a tapered cylinder 50 having a thinner proximal end 52 relative to the central member 12 and a thicker distal end 54 relative to the central member. The distal end 54 of the handle 14 is rounded. The handle 14 has a threaded hole 56. A threaded connector 58 is coupled to the central member 12. The threaded connector 58 is complimentary to the threaded hole 56 such that the handle 14 is couplable to the central member 12 by threadably engaging the connector 58 to the threaded hole 56 in the handle 14. The threaded connector 58 has a head section 60. The head section 60 has a circumferential groove 62. The central member 12 extends into the circumferential groove 62 such that the threaded connector 58 is coupled to the central member 12.

The central member 12 has a diameter between 20 and 30 centimeters. Each panel 16 has a length between 16 and 20 centimeters. Each panel 16 is tapered with a thinner end 64 having a width between 5 and 7 centimeters and a thicker end 66 having a width between 12 and 15 centimeters. The panels 16 overlap each other between 0.6 and 0.8 centimeters when the panels 16 are fully expanded.

In use, the handle 14 is held and the panels 16 are urged against a wheel 68 of a vehicle 70. Pressure against the panels 16 will urge the panels 16 to expand outwardly to cover the wheel hub 74. Tire dressing such as a cleaner or polish may then be applied to a tire 72 while the panels 16 cover the wheel hub 74. After application of the dressing, the handle 14 is pulled away from the wheel 68 to uncover the wheel hub 74. Thus, the panels 16 prevent overspray from contacting the wheel hub 74.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An expandable wheel shield assembly comprising:
   a central member;
   a handle coupled to said central member;
   a plurality of overlapping panels hingedly coupled to said central member, said panels being radially arranged around said central member;
   said panels being coupled to said central member such that said panels are resiliently urged into a contracted position;
   each panel having an aperture;
   said central member having a plurality of radially arranged slots;
   each said slot having a hook member extending through said slot; and
   each said hook member engaging said aperture of an associated said panel such that said panel is hingedly coupled to said central member.

2. The assembly of claim 1, further including a resilient band extending around said panels, said band urging said panels into said contracted position.

3. The assembly of claim 1, further including said handle being positioned in alignment with a center of said central member.

4. The assembly of claim 3, further comprising:
   said handle having a threaded hole;
   a threaded connector coupled to said central member; and
   said threaded connector being complimentary to said threaded hole such that said handle is couplable to said central member by threadably engaging said connector to said threaded hole in said handle.

5. The assembly of claim 4, further comprising:
   said threaded connector having a head section, said head section having a circumferential groove; and
   said central member extending into said circumferential groove such that said threaded connector is coupled to said central member.

6. The assembly of claim 3, further including said handle being a tapered cylinder having a rounded distal end relative to said central member.

7. The assembly of claim 1, further comprising:
   each said hook member having an offset portion, a medial portion extending from said offset portion, and a free distal end relative to a center of said central member; and
   said distal end of said hook member abutting a distal edge of said slot relative to said center of said central member.

8. The assembly of claim 1, further including a circumferential perimeter lip extending around said central member.

9. The assembly of claim 1, further including each said panel being arcuate extending between a proximal end relative to a center of said central member and a distal end of said panel relative to said central member.

10. The assembly of claim 1, further comprising:
    each said panel having a proximal end relative to said central member;
    each said panel having a distal end relative to said central member; and
    said distal ends of said panels aligning to form a circular outer perimeter edge.

11. The assembly of claim 10, further comprising:
    each said panel having a protrusion extending from said proximal end of said panel; and
    said aperture of each said panel being positioned in said protrusion of said panel.

12. The assembly of claim 1, further including each said panel being arched extending along a length of said panel.

13. An expandable wheel shield assembly comprising:
    a central member;
    a handle coupled to said central member;
    a plurality of overlapping panels hingedly coupled to said central member, said panels being radially arranged around said central member;
    said panels being coupled to said central member such that said panels are urged into a contracted position;
    each panel having an aperture;
    said central member having a plurality of radially arranged slots;
    each said slot having a hook member extending through said slot;
    each said hook member having an offset portion, a medial portion extending from said offset portion, and a free distal end relative to a center of said central member;
    said distal end of said hook member abutting a distal edge of said slot relative to said center of said central member;
    each said hook member engaging said aperture of an associated said panel such that said panel is hingedly coupled to said central member;
    a resilient band extending around said panels, said band urging said panels into said contracted position;
    a circumferential perimeter lip extending around said central member;
    each said panel being arcuate extending between a proximal end relative to a center of said central member and a distal end of said panel relative to said central member;
    said distal ends of said panels aligning to form a circular outer perimeter edge;
    each said panel being arched extending along a length of said panel;
    each said panel having a protrusion extending from said proximal end of said panel;
    said aperture of each said panel being positioned in said protrusion of said panel;
    said handle being positioned in alignment with said center of said central member;
    said handle being a tapered cylinder having a rounded distal end relative to said central member;
    said handle having a threaded hole;
    a threaded connector coupled to said central member;
    said threaded connector being complimentary to said threaded hole such that said handle is couplable to said central member by threadably engaging said connector to said threaded hole in said handle;
    said threaded connector having a head section, said head section having a circumferential groove; and
    said central member extending into said circumferential groove such that said threaded connector is coupled to said central member.

* * * * *